(12) United States Patent
Yerli

(10) Patent No.: US 11,489,924 B2
(45) Date of Patent: *Nov. 1, 2022

(54) LOCATION-BASED APPLICATION STREAM ACTIVATION

(71) Applicant: THE CALANY Holding S.ÀR.L., Luxembourg (LU)

(72) Inventor: Cevat Yerli, Frankfurt am Main (DE)

(73) Assignee: THE CALANY Holding S.À R.L, Luxembourg (LU)

( * ) Notice: Subject to any disclaimer, the term of this patent is extended or adjusted under 35 U.S.C. 154(b) by 92 days.

This patent is subject to a terminal disclaimer.

(21) Appl. No.: 16/901,968

(22) Filed: Jun. 15, 2020

(65) Prior Publication Data

US 2020/0404079 A1 Dec. 24, 2020

Related U.S. Application Data

(60) Provisional application No. 62/863,041, filed on Jun. 18, 2019.

(51) Int. Cl.
*H04L 67/131* (2022.01)
*G06T 11/00* (2006.01)
(Continued)

(52) U.S. Cl.
CPC ............ *H04L 67/131* (2022.05); *G06T 11/00* (2013.01); *H04W 4/021* (2013.01); *H04W 4/20* (2013.01); *G06T 2200/16* (2013.01)

(58) Field of Classification Search
CPC ..... H04L 67/38; G06T 11/00; G06T 2200/16; H04W 4/021; H04W 4/20
(Continued)

(56) References Cited

U.S. PATENT DOCUMENTS 8,239,132 B2 8/2012 Ma et al.
8,564,621 B2 10/2013 Branson et al.
(Continued)

FOREIGN PATENT DOCUMENTS

WO 2016/077493 A1 5/2016
WO 2018/144315 A1 8/2018
WO 2016-077493 A8 5/2019

OTHER PUBLICATIONS

European Search Report dated Nov. 6, 2020 issued in European Application No. EP20180791.4, 11 pages.
(Continued)

*Primary Examiner* — Jin Ge
(74) *Attorney, Agent, or Firm* — Christensen O'Connor Johnson Kindness PLLC

(57) ABSTRACT

A system and method enabling location-based activation of applications. The system comprises one or more servers storing and providing a persistent virtual world system including a virtual version of the real-world comprising one or more applications virtually attached to virtual-world entities positioned according to real-world coordinates, and being configured to compute the state of the virtual-world entities and to process the applications; send a minimum amount of application graphical representation to the user device responsive to receiving a notification of a user device accessing a trigger zone associated with the application(s); determine suitable application media streams to be sent to the user device responsive to receiving a notification of user interaction with the application graphical representation, perform heavy-load computational tasks on the media streams, and deliver the streams to the user devices, which perform lightweight computational tasks on the media content to output the media content.

20 Claims, 6 Drawing Sheets

(51) Int. Cl.
*H04W 4/021* (2018.01)
*H04W 4/20* (2018.01)

(58) Field of Classification Search
USPC .......................................................... 345/633
See application file for complete search history.

(56) References Cited

U.S. PATENT DOCUMENTS

| | | | |
|---|---|---|---|
| 8,681,179 | B2 | 3/2014 | Rolleston et al. |
| 9,129,429 | B2 | 9/2015 | Hammond |
| 9,142,038 | B2 | 9/2015 | Lotto et al. |
| 9,165,318 | B1 | 10/2015 | Pauley et al. |
| 9,319,835 | B2 | 4/2016 | Smith et al. |
| 9,338,599 | B1 | 5/2016 | Burgmeier et al. |
| 9,721,386 | B1 | 8/2017 | Worley, III et al. |
| 10,679,428 | B1* | 6/2020 | Chen ...................... G06K 9/627 |
| 2002/0158873 | A1 | 10/2002 | Williamson |
| 2003/0007678 | A1 | 1/2003 | Ohta |
| 2004/0249809 | A1 | 12/2004 | Ramani et al. |
| 2005/0131607 | A1 | 6/2005 | Breed |
| 2007/0115282 | A1 | 5/2007 | Turner et al. |
| 2009/0244059 | A1 | 10/2009 | Kulkarni et al. |
| 2009/0292464 | A1 | 11/2009 | Fuchs et al. |
| 2010/0325154 | A1 | 12/2010 | Schloter et al. |
| 2012/0236158 | A1 | 9/2012 | Oleksy et al. |
| 2012/0249416 | A1 | 10/2012 | Maciocci et al. |
| 2012/0309373 | A1 | 12/2012 | Abogendia |
| 2013/0009994 | A1 | 1/2013 | Hill |
| 2013/0178257 | A1 | 7/2013 | Langseth |
| 2013/0194164 | A1* | 8/2013 | Sugden .................. G06F 3/167 345/8 |
| 2014/0002444 | A1 | 1/2014 | Bennett et al. |
| 2014/0114845 | A1 | 4/2014 | Rogers et al. |
| 2014/0229542 | A1* | 8/2014 | Yu ........................ H04L 65/607 709/204 |
| 2014/0282220 | A1 | 9/2014 | Wantland et al. |
| 2014/0313197 | A1 | 10/2014 | Peuhkurinen |
| 2015/0235432 | A1 | 5/2015 | Brounder et al. |
| 2015/0188984 | A1 | 7/2015 | Mullins |
| 2015/0302664 | A1 | 10/2015 | Miller |
| 2016/0026253 | A1 | 1/2016 | Bradski et al. |
| 2016/0104452 | A1* | 4/2016 | Guan ...................... A63F 13/35 345/633 |
| 2016/0133230 | A1 | 5/2016 | Daniels et al. |
| 2017/0024093 | A1 | 1/2017 | Dziuk |
| 2017/0208109 | A1 | 7/2017 | Akselrod et al. |
| 2017/0228937 | A1 | 8/2017 | Murphy et al. |
| 2018/0108184 | A1 | 4/2018 | Takahashi |
| 2018/0204385 | A1* | 7/2018 | Sarangdhar ............ G08C 17/02 |
| 2018/0005450 | A1 | 9/2018 | Daniels et al. |
| 2018/0276891 | A1 | 9/2018 | Craner |
| 2018/0288393 | A1 | 10/2018 | Yerli |
| 2019/0102946 | A1 | 4/2019 | Spivack et al. |
| 2019/0172262 | A1 | 6/2019 | McHugh et al. |
| 2019/0361797 | A1 | 11/2019 | Yerli |
| 2019/0371073 | A1* | 12/2019 | Harviainen .......... H04N 21/431 |

OTHER PUBLICATIONS

European Search Report dated Nov. 19, 2020 issued in European Application No. EP20180898.7, 9 pages.
European Search Report dated Nov. 6, 2020 issued in European Application No. EP20180805.2, 8 pages.
European Search Report dated Oct. 21, 2020, issued in European Application No. EP20180810.2, 8 pages.
Meenakshi, V., et al., "An Innovative App With for Location Finding With Augmented Reality Using CLOUD," Proceedings of the 2nd International Symposium on Big Data and Cloud Computing (ISBCC'15); Procedia Computer Science 50:585-589, 2015.
European Search Report dated Nov. 19, 2020 issued in European Application No. 20180869.8, 9 pages.
Office Action dated Mar. 18, 2021 issued in U.S. Appl. No. 16/902,512, filed Jun. 16, 2020, 28 pages.
Hu, S., et al., "A Mobile Location-Based Architecture for Intelligent Selecting Multi-Dimension Position Data Over Internet," Sino-Korea Chongqing GIS Researcher Center, Chongqing, China; Intelligence GIS Research Center, Department of Computer Science and Engineering, Inha University, Korea, 2017, 4 pages.
Pontikakos, C., et al., "Location-Based Services: Architecture Overview," Informatics Laboratory, Agricultural University of Athens, 2017, 11 pages.
Office Action dated Jul. 8, 2021 issued in U.S. Appl. No. 16/904,163, filed Jun. 17, 2020, 14 pages.
Office Action dated Dec. 17, 2021, issued in U.S. Appl. No. 16/902,024, filed Jun. 15, 2020, 43 pages.
Office Action dated Dec. 21, 2021, issued in U.S. Appl. No. 16/903,114, filed Jun. 16, 2020, 13 pages.

* cited by examiner

LOCATION-BASED APPLICATION STREAM ACTIVATION

CROSS-REFERENCE TO RELATED APPLICATION

This application claims the benefit of Provisional Application No. 62/863041, filed Jun. 18, 2019, the entire disclosure of which is hereby incorporated by reference herein for all purposes.

FIELD

Aspects of the present disclosure relate generally to computer communications, and particularly to activation of application media content streaming in response to user interaction.

BACKGROUND

Generally, location based services (LBS) are deployed in wireless networks that may be accessed by wireless devices, such as mobile phones, tablet computers, head-mounted displays, and other devices. LBSs may include a broad range of services that may be based on the current location of a user with respect to a specific place. Examples of LBS include providing the location of the nearest restaurant, banking automatic teller machine (ATM), or the whereabouts of a person; parcel tracking; providing advertising directed at potential customers based on the current customer location; and personalized weather services. LBSs are typically provided via a wireless network to which a user of a wireless device may subscribe or connect to as a casual user. Once connected, the current user location may be derived from various types of information, such as GPS, uplink time difference of arrival (u-TDOA), and others.

Certain applications, especially those involving immersive interactive experiences (e.g., augmented reality, virtual reality or merged reality), may require media content rendering. Typically, these applications requiring immersive interactions are primarily downloaded and hosted on the client (device) side, resulting in high hardware demands to execute the applications. Users may also be required to download a plurality of applications, each application corresponding to a different type of experience, increasing memory and other hardware requirements on the user device. Furthermore, rendering using a user device, such as a mobile device or other mobile computers, due to hardware constraints, may limit the quality and type of media content that can be received by the users and the quality and speed of the media content streaming.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One or more problems are solved by embodiments of a system and method to enable location-based stream activation, as described herein.

A system according to embodiments of the current disclosure includes one or more servers comprising a memory and a processor, the one or more servers storing and providing a persistent virtual world system including a virtual version of the real-world comprising one or more applications associated with or virtually attached to virtual-world entities positioned according to real-world coordinates, and the one or more servers being configured to, at least: compute the state of the virtual-world entities and to process the one or more applications. In an embodiment, one or more user devices are connected to the one or more servers via a network and configured to receive and execute the one or more applications.

Responsive to detecting a user device entering a trigger zone configured around the one or more applications the one or more servers send a minimum amount of application graphical representation associated with the one or more applications to the user device via a wireless network. In an embodiment, the entry of the user device(s) into a trigger zone is detected by receiving a notification of the position of the user device(s) (e.g., from a wireless network that tracks the position of the user device(s)), which is compared to a known boundary of the trigger zone. Responsive to detecting user interaction with the application graphical representation, the one or more servers determine two or more media streams based on user viewing position, orientation, and viewing angles, thereafter performing heavy-load computations on the media content to be delivered to users via the user devices. The server may finally send the rendered media content to the user devices, which may only require performing lightweight computational tasks thereon in order to output the media content to users.

Thus, the current system and method enable users to view applications upon a user's proximity to objects to which the applications are virtually attached, as well as enabling user devices, upon interaction, to seamlessly stream media content respective to the applications. The user devices may only need to download the application graphical representation and to perform lightweight computational tasks on the computed media content in order to adequately represent the applications, avoiding the need to download any large application files.

According to an embodiment, the servers may be provided as hardware and software including a processor and a memory, wherein the processor may be configured to execute instructions included in a memory coupled to the server, and wherein the memory is configured to store instructions and data. The functionality enabled by the instructions may include at least pre-processing of media content, determination of suitable media streams, and rendering of media content. Pre-processing of media content may include at least performing sound and video compression and assembling.

According to an embodiment, once streaming on the user device has started, if users leave the server zone, the users may have the option to continue interaction with the application outside of the server zone. In this case, the heavy-load computations on media content may be transferred to other servers in other server zones.

The memory may store a persistent virtual world system, which may include a virtual version of the real-world comprising virtual-world entities positioned according to real-world coordinates, including latitudinal and longitudinal positional and orientational data. The virtual-world entities to which the applications may be virtually attached may represent real-world objects or may be fully virtual objects not existing in the real world. By way of example, a user may, within an application trigger zone, view a real-world object including an application that may be positioned based on the position, orientation, and dimension of the real-world object. In another example, the user may, within an application trigger zone view applications attached to items existing only in the virtual world but attached to an existing location in the real world. In some embodiments, the persistent virtual world system may additionally include one or more application stores configured in the real world space, each comprising one or more applications. In some embodiments, the applications may be accessed completely virtually by users. In other words, a user may employ a user device to travel in virtual reality to places stored in the persistent virtual world system without physically having to move to those places. The places may be places found in the real-world, may be computer-generated places found only in a virtual-world, or may include combinations thereof. In these embodiments, users may be able to view and access the applications after accessing a virtual trigger zone configured around the virtual entity.

In some embodiments, the servers may be located in computing centers located in areas relatively close to the items virtually attached to the applications. The compute centers may refer to facilities arranged to house computer systems and associated components, such as telecommunication and storage systems, power supplies, redundant data communication connections, environmental controls, and various security devices.

According to an embodiment, the user devices may include various operational components comprising at least an input and output module configured to enable interaction with users, a power source configured to provide power to the user device, a memory configured to store application program instructions and telemetry metadata, one or more sensors configured to obtain various telemetry metadata from users, one or more transceivers configured to send and receive communication signals to and from antennas, and a network interface configured to connect to the network and receive computer readable instructions from the network, each operational further operatively connected to a processor.

In an embodiment, in order to reduce hardware and network demands, contribute to the reduction of network latency, and improve the general digital reality experience, the system may connect through a network including millimeter-wave (mmW) or combinations of mmW and sub 6 GHz communication systems, such as through 5th generation wireless systems communication (5G). In other embodiments, the system may connect through wireless local area networking (Wi-Fi), which may provide data at 60 GHz. Provided communication systems may allow for about 1 to about 5 millisecond end-to-end (E2E) latency and 1-10 Gbps downlink speeds to end points in the field, complying with parameters necessary for executing the typically highly-interactive applications. This results in high-quality, low latency, real-time digital application content streaming In other embodiments, the system may communicatively connect through 4th generation wireless systems communication (4G), may be supported by 4G communication systems, or may include other wired or wireless communication systems.

According to an embodiment, the sensing mechanisms mounted on the user devices include a combination of inertial tracking sensing mechanisms and transceivers. The inertial tracking sensing mechanisms can make use of devices such as accelerometers and gyroscopes, which may be integrated in an inertial measuring unit (IMU). The transceivers may be implemented to send and receive radio communication signals to and from antennas. In an embodiment, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high QOS functionalities provided by mmW-based antennas may enable sub-centimeter or even sub-millimeter positional and orientational tracking, which may increase accuracy when tracking the real-time position and orientation of the client elements. In some embodiments, tracking may be implemented by employing several techniques known in the art, such as time of arrival (TOA), angle of arrival (AOA), or other tracking techniques known in the art (e.g., visual imaging, radar technology, etc.). In alternative embodiments, the sensing mechanisms and transceivers may be coupled together in a single tracking module device.

A computer-implemented method performed by a server system comprising one or more server computers according to embodiments of the current disclosure comprises providing, in memory of a server system comprising one or more server computers, a persistent virtual world system including a virtual version of the real-world comprising one or more applications virtually attached to virtual-world entities positioned according to real-world coordinates; receiving a location of one or more user devices; determining whether the one or more user devices have entered an application trigger zone based at least in part on the location of the one or more user devices; providing, upon determining that the one or more user devices have entered an application trigger zone, a minimum amount of application graphical representation to the one or more user devices; determining, upon receiving a notification that the one or more user devices have downloaded or otherwise received the minimum amount of application graphical representation, two or more media streams based on the user viewing position, orientation, and viewing angles; performing, responsive to determining the two or more media streams, heavy-load computational tasks on the application media content; and sending rendered media content to the one or more user devices, which may only require performing lightweight computational tasks thereon in order to output the media content to users.

In an embodiment, heavy-load computational tasks comprise pre-processing, by the one or more servers, of the application media content, the pre-processing comprising at least sound and video compression operations. The heavy-load computational tasks on media content may further comprise physics simulations, lighting, shadows simulations, or rendering, or combinations thereof.

In an embodiment, the process of determining media streams may be further based on profile information of a user stored in memory or obtained from another computing device or system, e.g., through social media networks or other data-sharing platforms.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary Other features and advantages will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

Figure 1A:
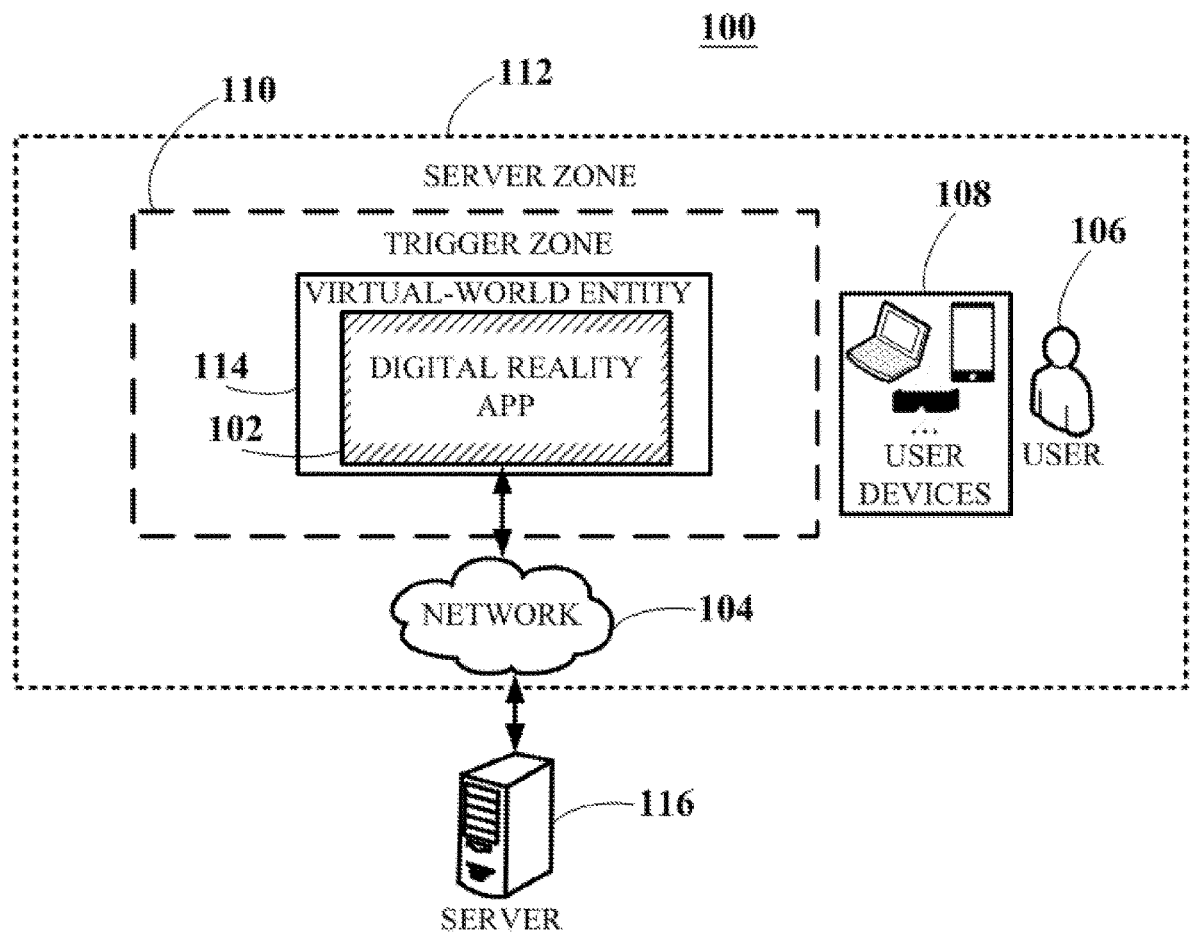
FIGS. 1A-1B depict a schematic representation of a system according to an embodiment of the present disclosure.
Figure 1B:
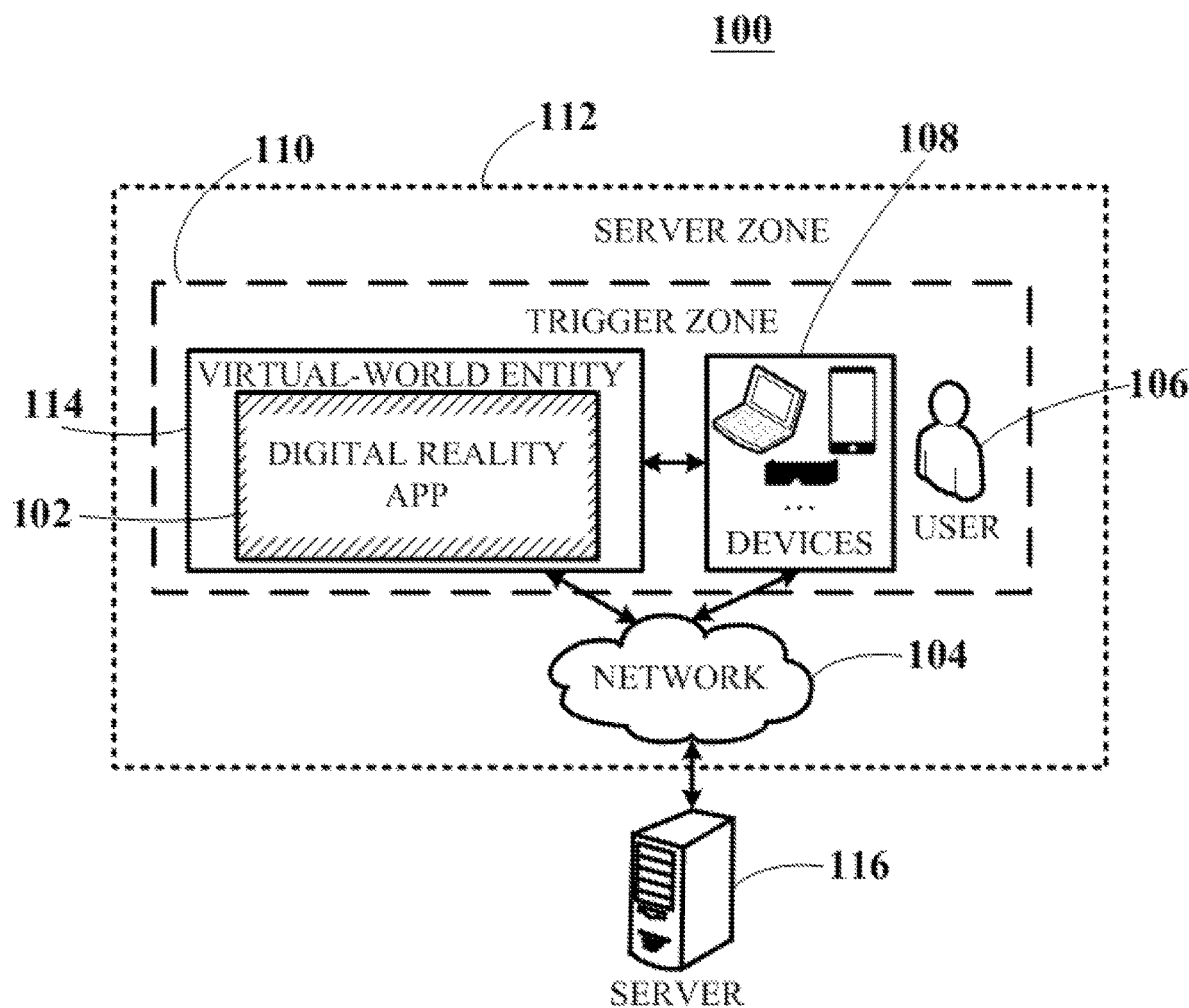

FIGS. 1A-1B show a schematic representation of a system 100 according to an embodiment of the present disclosure. The system 100 enables the seamless and automatic media content streaming respective to one or more digital reality applications 102 over a network 104 upon user interaction with a minimum amount of graphical representation of the applications 102.

In an exemplary embodiment shown in FIG. 1A, a user 106 employing a user device 108 may be first located in an area outside of a trigger zone 110. The trigger zone 110 may be provided within a server zone 112, and may be determined by a perimeter configured around the application 102 associated with or virtually attached to an entity 114.

When the application 102 is virtually attached to an entity, the trigger zone 110 associated with the application 102 may, for example, move or be positioned or repositioned within a space in tandem with the entity to which it is virtually attached, or be removed from or reintroduced into a space as the entity to which it is attached is removed from or reintroduced into that space. Alternatively, the application 102 may be unattached or detached from an entity to which it was virtually attached. If the application is unattached, the application may be positioned in a space independent of the position of any entity. If the application is detached from an entity to which it was virtually attached, the application may, for example, be removed from a space in which that entity is still present, or remain in a fixed location that is independent of the location of that entity, or move independently of that entity.

The application 102 may further include positional, orientational, and dimensional data of the entity 114 stored in a server 116. The server zone 112 may be configured around the trigger zone 110, and may be provided in areas relatively close to the server 116. The server zone 112 may include one or more applications 102 and respective trigger zones 110.

Although the system 100 is described as including a single server 116 in examples disclosed herein, it should be understood that functions described herein as being performed by a single server (e.g., server 116) may instead be performed by server system comprising multiple server computers, or vice versa.

A trigger zone can be calculated as a distance between a user and the virtual position where an application has been configured in the real world. For example, the trigger zone could be set for, e.g., from 10 to 30 meters around a location, object, or entity associated with an application. Alternatively the trigger zone can be set according to the field of view of the user, e.g., when the location, object, or entity associated with an application is in the field of view of the user, then the application may be triggered for that specific user. A field of view trigger zone may be independent of distance from the user. Alternatively, a trigger zone can also be an area defined by the field of hearing of a user (e.g., when a user cannot see a location, object, or entity associated with an application because it is hidden behind another object, but he could in theory hear any sounds from it). This type of trigger zone may be limited by distance but may also take into account any potential sound absorption by nearby materials or objects.

Following the description in FIG. 1B, as the user 106 approaches the trigger zone 110, the network 104 may detect and track the user device 108 based on the location data of the user device 108. Once the client accesses the trigger zone 110, the network 104 may signal the server 116 to send a minimum amount of application graphical representation to the user device 108. As used herein, the term "minimum amount" does not refer to a smallest possible amount, but rather a predefined or threshold amount. The minimum amount may vary depending on system design, user preferences, or the like. Examples of possible minimum amounts are provided below.

If the user 106 interacts with the application graphical representation via the user device 108, the server 116 may determine two or more media streams based on the user viewing position, orientation, and viewing angles, which may be calculated using, e.g., position, orientation, and/or viewing angle information received from the user device, or external gaze tracking systems, or other sources, or combinations thereof. Afterwards, the server 116 may continue by performing heavy-load computations on the media content to be delivered to user 106 via the user device 108, and then may send the computed media content to user device 108, which may only need to perform lightweight computational tasks on the rendered media content in order to adequately output the media content via to the user. The virtual-world entities to which the applications may be virtually attached, may represent real-world objects or may be fully virtual objects not existing in the real world. The virtual-world entities representing real-world objects may be referred herein to virtual replicas.

In the current disclosure, the term "virtual replica" refers to accurate and persistent virtual representations of real-world elements. In an embodiment, a virtual replica comprises data and models that provide self-computing capabilities and autonomous behavior. The data and models of the virtual replicas may be input through a plurality of software platforms, software engines, and sensors connected to real-world elements. Data are the attributes of the virtual replicas and the models are the graphical, mathematical and logic representations of any aspect of the corresponding real-world element that may be used to replicate the reality in the persistent virtual world system, such as 3D models, dynamic models, geometric models, and machine learning models.

In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and digital reality applications therein comprised continue to exist after the processes used for creating the virtual replicas, purely virtual objects and digital reality applications cease, and independent of users being connected to the virtual world system. Thus, the virtual world system is saved in a non-volatile storage location (e.g., in a server). In this way, virtual replicas, purely virtual objects and digital reality applications may interact and collaborate with each other when being configured for accomplishing specific goals even if users are not connected to the server.

"Self-computing capabilities", also referred to as "self-managing capabilities" refers herein to the ability of a virtual replica of the persistent virtual world system to apply artificial intelligence algorithms in order to autonomously manage computer resources (e.g., distributed computing resources). In an embodiment, virtual replicas with self-computing capabilities are able to autonomously manage computing resources to adapt to changes in the environment of corresponding real-world elements or in the real-world elements themselves. Thus, in an embodiment, each virtual replica may act autonomously depending on the conditions in the real world reflected in the persistent virtual world system, e.g., by allocating required resources, autonomously sending and executing commands and generating events, as may be required by each circumstance. Achieving this type of behavior may require training the virtual replicas with artificial intelligence algorithms during the modeling of the virtual replicas. Thus, the role of a virtual replica editor may be limited to defining general policies and rules that guide the self-management process. For example, in the case of a car accident, the virtual replicas of autonomous vehicles close to the accident may decide to lower their speed or come to a stop in order to worsen traffic conditions, and notify the relevant authorities, before the passengers in the vehicle can even know that there was an accident.

The system 100 of the current disclosure may be implemented in a cloud to edge infrastructure that may display distributed computing capabilities employing public or private clouds, fog servers, and edge devices and systems, such as enterprise systems, mobile platforms, and user devices, all of which may connect through a network. Using a cloud to edge computing network, access to computing power, computer infrastructure (e.g., through so-called infrastructure as a service, or IaaS), applications, and business processes can be delivered as a service to users via client devices on demand This way, resources including physical servers and network equipment enable a shared storage and computing that may be dynamically allocated depending on factors such as the distance of the user to the resources and the network and computational demand from the users.

A pair of virtual-real twin, or twin-pair, comprises a real-world element and its corresponding virtual replica, or virtual twin, and can be considered as a Cyber-physical system or CPS. The CPS is an integration of computation with physical processes whose behavior is defined by both cyber and physical parts of the system. Therefore, a virtual replica is the cyber part of the CPS, while the physical part is the real world element. In an embodiment, the virtual replica may then be considered as an extension of the real twin that allows connecting the physical part with artificial intelligence and simulations to improve the object's capabilities and performance.

In some embodiments, a virtual replica includes one or more of 3D world and building data, such as SLAM or derivate-mapping based data; 3D geometry data; 3D point cloud data; or geographic information system data representing real-world structural properties that may serve to model a 3D structure for digital reality applications.

In some embodiments, each of the virtual replicas of the persistent virtual world system may be geolocated using a reference coordinate system suitable for use with current geolocation technologies. For example, the virtual replicas may use a World Geodetic System standard such as WGS84, which is the current reference coordinate system used by GPS.

The virtual replicas may represent elements connected to the persistent virtual world system, such as user devices and other devices, and also unconnected elements. The user devices may be, for example, mobile devices, personal computers, game consoles, media centers, smart contact lenses, and head-mounted displays. The other devices may refer to any device or machine that can be connected to a network, can communicate with each other, and which receives sensory information from a plurality of sources, a technological concept known nowadays as the Internet of Things (IoT), and such devices can be referred to as IoT devices. Unconnected elements refer to elements for which the virtual replica models are based only on the respective real appearance and physics of the corresponding real element, but which are not connected to the persistent virtual world system and thus do not send any real-time state updates. These unconnected elements may be, for example, topographical and other naturally-occurring elements, such as trees, mountains, terrains, and the sky, which may have been modeled according to their visual appearance and physics but which may not contain sensors to capture real-time data from them.

Modeling techniques for converting real-world objects into virtual replicas may be based on techniques known in the art. For example, building owners may provide already-existing digital models of a building which may be integrated in the persistent virtual world system 104. In other embodiments, radar-imaging, such as synthetic-aperture radars, real-aperture radars, Light Detection and Ranging (LIDAR), inverse aperture radars, monopulse radars, and other types of imaging techniques may be used to map and model real-world objects before integrating them in the persistent virtual world system.

By way of example, in a case in which an application 102 is virtually attached to a virtual replica of a real-world object, the application 102 may be virtually attached to a real-world shoe positioned somewhere within a park. In this example, the application 102 may need to be configured (e.g., during the application's development stage) to be available at the real-world coordinates of the shoe. The system may provide multiple types of information about the shoe, including the shoe's position, orientation, and dimensions in the real-world coordinates. A digital version of the shoe stored in the server 116 may be visible to the user 106 via user devices 108 as a static or animated shoe after the user 106 has accessed the trigger zone 110 configured around the shoe. The virtual shoe may, for example, be statically floating in the air, and may also be performing an animation in a loop, such as rotating around its central axis. In another example, a fully virtual object not existing in the real world, such as a virtual shoe that does not exist in real life and which may be configured to be floating in the air. In this example, the user 106 would only be able to view the floating shoe via the user device 108.

The examples above describe applications virtually attached to static virtual world entities. However, applications can also be virtually attached to dynamic virtual world entities, such as a real-world person. In this example, the trigger zone 110 of the application 102 may be deployed during the application development stage around the user device 108 of the real-world person, and the coordinates of the application may be based upon a continuous tracking of one or more user devices 108 carried by the user 106. Therefore, the application 102 may be activated once a user 106 has accessed the trigger zone 110 located around the person to which the application 102 is virtually attached, and may thereafter begin interactions with the media content from the application 102.

According to an embodiment, once the server 116 has begun streaming the media content corresponding to the application 102, if users leave the server zone 112, the users may have the option to continue interaction with the application 102 outside of the server zone 112. According to an embodiment, a minimum amount of application graphical representation may include one or more images showing a clear representation of an application to a user 106 and requiring only low amounts of data to be downloaded by a user device 108. For example, a minimum amount of application graphical representation may include one or more static two-dimensional images, dynamic two-dimensional images animated in a loop, static three-dimensional images, dynamic three-dimensional images animated in a loop, or any combination thereof.

In some embodiments, servers 116 may be located in compute centers located in areas relatively close to virtual-world entities 114. The compute centers may refer to facilities arranged to house computer systems and associated components, such as telecommunication and storage systems, power supplies, redundant data communication connections, environmental controls, and various security devices. According to an embodiment, the network 104 may comprise antennas (not shown) may be configured to provide communication to elements of system 100. Antennas may be connected through wired or other means to compute centers. In other embodiments, the antennas are provided within the compute centers and/or areas services by compute centers. In some embodiments, in order to service user devices 108 located outdoors, the antennas may include millimeter wave (mmW)-based antenna systems or a combination of mmW-based antennas and sub 6 GHz antenna systems. In other embodiments, the antennas may include other types of antennas, such as 4G antennas, or may be used as support antennas for the mmW/sub GHz antenna systems. In embodiments where antennas used for servicing interaction devices located indoors, the antennas may use wireless local area networking (WiFi), including, but not limited to, providing data at 60 GHz.

In other embodiments, global navigation satellite systems (GNSS), which refers generally to any satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

In some embodiments, tracking of the user device 108 by the network 104 may be performed employing several techniques known in the art. For example, tracking may be performed by employing time of arrival (TOA), angle of arrival (AOA), and other tracking techniques known in the art (e.g., visual imaging, radar technology, etc.).

According to an embodiment, user devices 108 may include hardware and software that enable connection to a wireless network 104 and which may enable interaction with one or more applications 102. User interaction with applications 102 via user devices 108 may be gesture-enabled, whereby the users 106 may employ one or more gestures for interaction. For example, the gestures can be natural user interface (NUI) gestures, which enable users to naturally interact with a device, free from artificial constraints imposed by input devices such as mice, keyboards, remote controls, and the like. Examples of NUI methods include those methods that employ gestures, such as tactile and non-tactile interfaces such as speech recognition, touch recognition, facial recognition, stylus recognition, air gestures (e.g., hand poses and movements and other body/appendage motions/poses), head and eye tracking, voice and speech utterances, and machine learning related at least to vision, speech, voice, pose, and touch data, for example. NUI technologies include, but are not limited to, touch sensitive displays, voice and speech recognition, intention and goal understanding, motion gesture detection using depth cameras (e.g., stereoscopic camera systems, infrared camera systems, color camera systems, and combinations thereof), motion gesture detection using accelerometers/gyroscopes, facial recognition, 3D displays, head, eye, and gaze tracking, immersive augmented reality and virtual reality systems (e.g., HoloLens™, by Microsoft Corporation, or Oculus Rift™ which are head-mounted computer devices having a display that uses holographic lenses and spatial sound, as well as other capabilities), all of which provide a more natural user interface, as well as technologies for sensing brain activity using electric field sensing electrodes (e.g., electro-encephalograph (EEG)) and other neuro-biofeedback methods.

According to an embodiment, media content from the applications 102 may include at least one of the following: image data, 3D geometries, video data, audio data, textual data, haptic data, or a combination thereof. Additionally, one or more parts of the media content may include augmented reality (AR), virtual reality (VR), or mixed reality (MR) digital content. The AR digital content may include physical, real-world environment elements augmented by computer-generated sensory input such as sound, video, graphics, or GPS data. Augmentation techniques are typically performed in real-time and in semantic context with environmental elements, such as overlaying supplemental information or virtual objects in the real world. The AR digital content allows information about the surrounding real world of a user 106 or virtual objects overlay in the real world to become interactive and digitally manipulable. The VR digital content may include virtual elements that are used to replace the real world with a simulated one. The MR digital content may include a mixture of augmented physical, real-world environment elements interacting with virtual elements. For example, an MR experience may include a situation where cameras capture real humans. Subsequently, suitable computer software creates a 3D mesh of the humans that is then inserted into a virtual world and is able to interact with the real world.

Recordings or generation of media content used in applications 102 may be performed through methods described in patent application no. PCT/EP2016/001626 filed on Apr. 6th, 2017 by the same inventor of the current disclosure. As explained in that disclosure, when a prerecorded or live media is later presented as media content to one or more users 106, then it is desirable to take into account the actual viewing direction and relative head location of each user 106 so that each individual user 106 can be served with an output stream including the right images with the right parallax information. For this purpose, the user device 108 may be equipped with sensors to determine a relative position of the user device 108 as well as a relative orientation of the headset (three angles) with regard to the viewer. This tracking information may amount to 6 degrees of freedom for the server 116 to determine how the output stream will be generated from the plurality of media streams. The perspective of the user device including viewing position, viewing orientation, and/or viewing angles may be compared by the server 116 to a field of view or perspective from prerecorded or live videos recorded by an array of cameras or generated by computers. Subsequently, the server 116 may determine two or more media streams to be presented to the user device, and may determine the one or more media streams that correspond best to the viewing position, viewing orientation, and/or viewing angles of the user 106. Similarly, determining the minimum amount of application graphical representation displayed to a user may include taking into account the user viewing position, viewing orientation, and/or viewing angles in order to display the correct images to the user.

Figure 2:
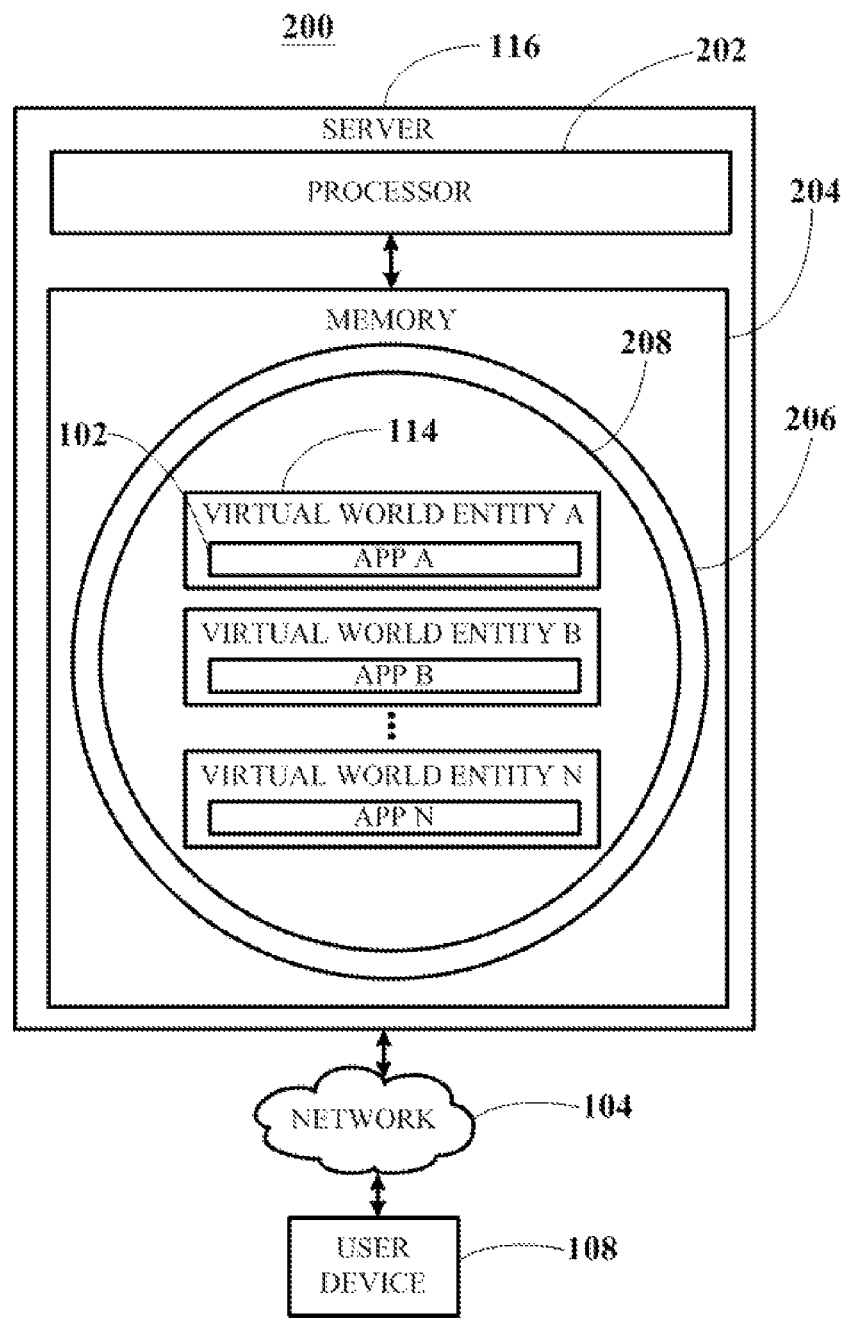
FIG. 2 depicts a schematic illustration of a system according to an embodiment of the present disclosure, detailing a representation of a cloud server.

FIG. 2 depicts a schematic illustration of a system according to an embodiment of the present disclosure, detailing a representation of a server 116. FIG. 2 may include similar elements as those of FIGS. 1A-1B and may therefore contain the same or similar reference numbers.

In FIG. 2, the exemplary server 116 is communicatively connected to a user device 108 via a network 104, and includes at least a processor 202 and a memory 204.

The processor 202 may be configured to access and execute instructions and data included in the memory, including processing of the media content from the application. The processing may include various operations to enable input coming from an application, such as visual and sound input, and converting that input into an output video stream that is thereafter streamed to a user device 108. When receiving media content from the applications, the processor 202 may perform pre-processing operations of the media content, including sound and video compression and assembling. The processor 202 may additionally determine two or more media streams to be delivered to a user device 108 based on the user device 108 viewing position, orientation, and/or viewing angles; and perform rendering tasks of the media streams. Similarly, the processor 202 may, upon a user accessing a trigger zone, determine a suitable positioning of the minimum amount of application graphical representation based on the client viewing position, orientation, and/or viewing angles. After determining the two or more media streams, the processor 202 may perform heavy-load computations on the media content in a way that the user device 108 may only need to perform lightweight computational tasks on the processed media content in order to adequately represent the processed media content to users.

Rendering of media content may include various rendering techniques that may form two or more photorealistic 3D media streams of media received from applications, including but not limited to, warping, stitching and interpolating the two or more media streams. The rendering may include a more complex reconstruction process based on the input stream data. For example, the rendering may rely on a combination of standard image reconstruction techniques, such as stitching, warping, interpolation and extrapolation. For example, extrapolation may be needed in areas where no or limited (visual) information is available based on the available media streams, in order to fill up blanks or holes in the media data. However, it is to be understood that the reconstruction process is not limited to computer vision techniques and may further take into consideration spatial data about the scene, which may include one or more of reconstructed 3D geometry information, parameters about materials, and a light field, which may correspond to a flow of light in the captured scene, and the like, in any combination. The spatial data may be used to re-render the captured scene with 3D rendering techniques. In one or more embodiments, the rendering of the output stream may include using a deep learning technique and/or neural networks that may be applied to recreate images or frames of the output stream from a sequence of images or frames of the media streams of the same scene taken from different viewpoints. This may enable a complex reconstruction and generation of the output stream even if at least a part of the scene is not captured completely or in full detail.

In some embodiments, the processor 202 is not restricted to two-dimensional visual output data from applications, and may, for example, be capable of receiving a stereoscopic output of the application and related commands and producing two video streams or one interlaced video stream, transporting visual data for each respective eye of a user. Similarly, the processor 202 may also be capable of generating an audio stream carrying spatial sound data as well as data streams for other multi-dimensional multi-modal data.

In one embodiment, the plurality of media streams may be further processed such that the quality of the output stream is focused to a position where the viewer is actually looking at, such as based on a determined gaze direction, or in the center of a frame. Furthermore, the media streams may be processed in order to enable predicted motion reconstruction or to extrapolate the media streams, including a prediction where the viewer is going to look at next and reconstructing this area in advance. Furthermore, additional processing may be applied that takes into account the focusing distance of the eyes (for instance determined by the relative position and orientation of the pupils) to further improve the quality and fidelity of the output streams. Non limiting examples are focusing distance dependent shift and parallax effects as well as defocus blurring of those parts of the scene that can be determined to be out of focus for the viewer.

The memory 204 may store information accessible by the processor 202, including instructions and data (not shown), which may be executed by the processor 202. The memory 204 may be of any suitable type capable of storing information accessible by the processor 202, including a computer-readable medium, or other medium that stores data that may be read with the aid of an electronic device, such as a hard-drive, memory card, flash drive, ROM, RAM, DVD or other optical disks, as well as other write-capable and read-only memories. The memory 204 may include temporary storage in addition to persistent storage. Instructions may be executed directly (e.g., machine code), or indirectly (e.g., scripts) by the processor 202. The instructions may be stored in object code format for direct processing by the processor 202, or in any other computer language including scripts or collections of independent source code modules that may be interpreted on demand or compiled in advance. Data may be retrieved, stored, or modified by the processor 202 in accordance with the instructions. Data may, for example, be stored in computer registers, in a relational database as a table having a plurality of different fields and records, XML documents, or flat files. The data may also be formatted in any computer-readable format.

The memory 204 may include a persistent virtual world system 206. The persistent virtual world system 206 may include a virtual version of the real-world comprising real-world entities positioned according to real-world coordinates, including latitudinal and longitudinal positional and orientational data. The persistent virtual world system 206 may additionally include one or more application stores 208 configured in real-world space, each comprising one or more applications 102. Each application 102 of the application stores 208 may be virtually attached to a virtual-world entity made available at a real-world location and may be represented by a minimum amount of application graphical representation.

In some embodiments, the applications 216 may be accessed completely virtually (i.e., in virtual reality) by users. In other words, a user may employ a user device 108 to virtually travel to virtual places stored in the persistent virtual world system 206 without physically having to move to those places. The places may be places found in the real-world, may be computer-generated places found only in a virtual-world, or may include combinations thereof. In these embodiments, users may be able to view and access the applications 216 after accessing a virtual trigger zone configured around the virtual entity.

Figure 3A:
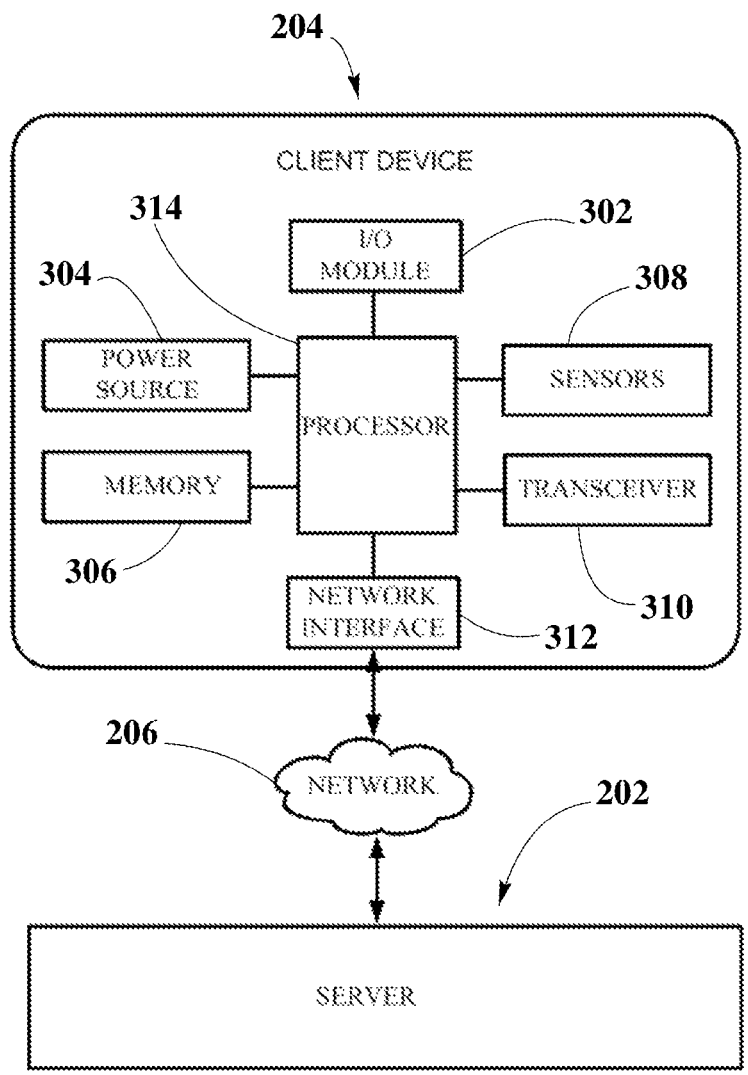
FIGS. 3A-3B depict a schematic illustration of a system according to an embodiment of the present disclosure, detailing a representation of a user device.
Figure 3B:
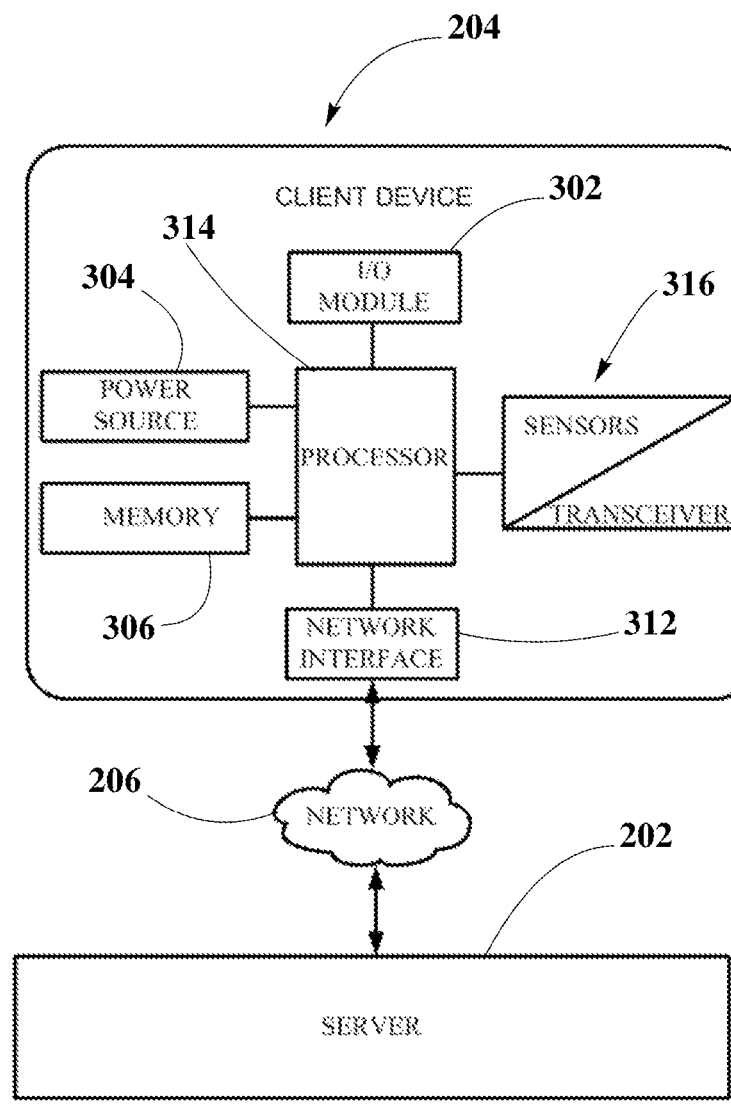

FIGS. 3A-3B depicts a schematic illustration of a system according to an embodiment of the present disclosure, detailing a representation of a user device 108. In some embodiments, the user device 108 is implemented as a computing device including hardware and/or software configured to receive consumable media data and present content to users in the form of immersive content.

In FIG. 3A, the user device 108 is communicatively connected to a server 116 via a network 104. The user device 108 may include system components such as an input/output (I/O) module 302, a power source 304, a memory 306, sensors 308, and a transceiver 310, and a network interface 312, all operatively connected to a processor 314.

The I/O module 302 is implemented as computing hardware and software configured to interact with users and provide user input data to one or more other system components. For example, I/O module 302 may be configured to interact with users, generate user input data based on the interaction, and provide the user input data to the processor 314 of the user device 108 before being transferred to other processing systems, such as server 116. In another example, I/O modules 302 is implemented as an external computing pointing device (e.g., a touch screen, mouse, 3D control, joystick, gamepad, and the like) and/or text entry device (e.g., a keyboard, dictation tool, and the like) configured to interact with user devices 108. In yet other embodiments, I/O module 302 may provide additional, fewer, or different functionality to that described above.

The power source 304 is implemented as computing hardware configured to provide power to the user devices 108. In one embodiment, the power source 304 may be a battery. The power source 304 may be built into the user devices 108 or removable from the user devices 108, and may be rechargeable or non-rechargeable. In one embodiment, the user devices 108 may be repowered by replacing one power source 304 with another power source 304. In another embodiment, the power source 304 may be recharged by a cable attached to a charging source, such as a universal serial bus ("USB") FireWire, Ethernet, Thunderbolt, or headphone cable, attached to a personal computer. In yet another embodiment, the power source 304 may be recharged by inductive charging, wherein an electromagnetic field is used to transfer energy from an inductive charger to the power source 304 when the two are brought in close proximity, but need not be plugged into one another via a cable. In another embodiment, a docking station may be used to facilitate charging.

The memory 306 may be implemented as computing software and hardware adapted to store application program instructions and to store telemetry metadata of the user devices 108 from the sensors 308. The memory 204 may be of any suitable type capable of storing information accessible by the processor 314, including a computer-readable medium, or other medium that stores data that may be read with the aid of an electronic device, such as a hard-drive, memory card, flash drive, ROM, RAM, DVD or other optical disks, as well as other write-capable and read-only memories. The memory 204 may include temporary storage in addition to persistent storage.

The sensors 308 may be implemented as computing software and hardware adapted to obtain various telemetry metadata from users. The sensors 308 may include, for example, one or more of an Inertia Measuring Unit (IMU), accelerometers, gyroscopes, light sensor, haptic sensors, a camera, eye-tracking sensors, and a microphone, amongst others. The IMU is configured to measure and report the velocity, acceleration, angular momentum, speed of translation, speed of rotation, and other telemetry metadata of the user device 108 by using a combination of accelerometers and gyroscopes. Accelerometers within the IMU may be configured to measure the acceleration of the interaction device, including the acceleration due to the Earth's gravitational field. In one embodiment, accelerometers within the IMU may include a tri-axial accelerometer that is capable of measuring acceleration in three orthogonal directions. In other embodiments one, two, three, or more separate accelerometers may be included within the IMU. In other embodiments, additional accelerometers and gyroscopes may be included separate from the IMU. The light sensors, haptic sensors, camera, eye-tracking sensors, and microphone may be used to capture input details from a user and his or her environment, which may be transmitted to a server to determine one or more media streams to be delivered to the user device depending on the user's viewing positions and orientations, distance from an application, and environmental factors, such as lighting and sounds, as well as enabling voice and haptic-related interactions.

The transceivers 310 may be implemented as computing software and hardware configured to enable the user device 108 to receive communication signals from antennas and to send the data back to the antennas when interactive with media content. In some embodiments, mmW transceivers may be employed, which may be configured to receive mmW wave signals from antennas and to send the data back to antennas when interacting with immersive content. The transceiver 310 may be a two-way communication transceiver 310.

In an embodiment, combining the capabilities of the IMU, accelerometers, and gyroscopes with the positional tracking provided by the transceivers 310 and the accurate tracking, low-latency and high QOS functionalities provided by mmW-based antennas may enable sub-centimeter or sub-millimeter positional and orientational tracking, which may increase accuracy when tracking the real-time position and orientation of the interaction devices and may improve the general user experience when interacting with immersive media content.

The network interface 312 may be implemented as computing software and hardware to communicatively connect to the network 104, receive computer readable program instructions from the network 104 sent by the server 116, and forward the computer readable program instructions for storage in the memory 306 of the user device for execution by the processor 314.

The processor 314 may be implemented as computing hardware and software configured to receive user input data, provide imaging requests, receive imaging data, process imaging data into environment or other data, process user input data and/or imaging data to generate user interaction data, provide server requests, receive server responses, and/or provide user interaction data, environment data, and content object data to one or more other system components. For example, the processor 314 may receive user input data from I/O module 302 and may respectively implement application programs stored in the memory 306 of the user device 108. In other examples, the processor 314 may receive location, position, or other telemetry metadata from sensors 308 (e.g., information about a user's hand movements, controller manipulation, traveling trajectory, etc.), from transceiver 310, or from combinations thereof. The processor 314 may also be capable of implementing analog or digital signal processing algorithms such as raw data reduction or filtering.

FIG. 3B shows an embodiment whereby the user device 108 includes an I/O module 302, power source 304, a memory 306, a coupled sensor/transceiver 316, and a network interface 312 all operatively connected to a processor 314. The functionality of the various components of the user device 108 is the same as detailed in FIG. 3A.

In other embodiments, one or more components of user device 108 may be omitted, or one or more additional components may be added.

Figure 4:
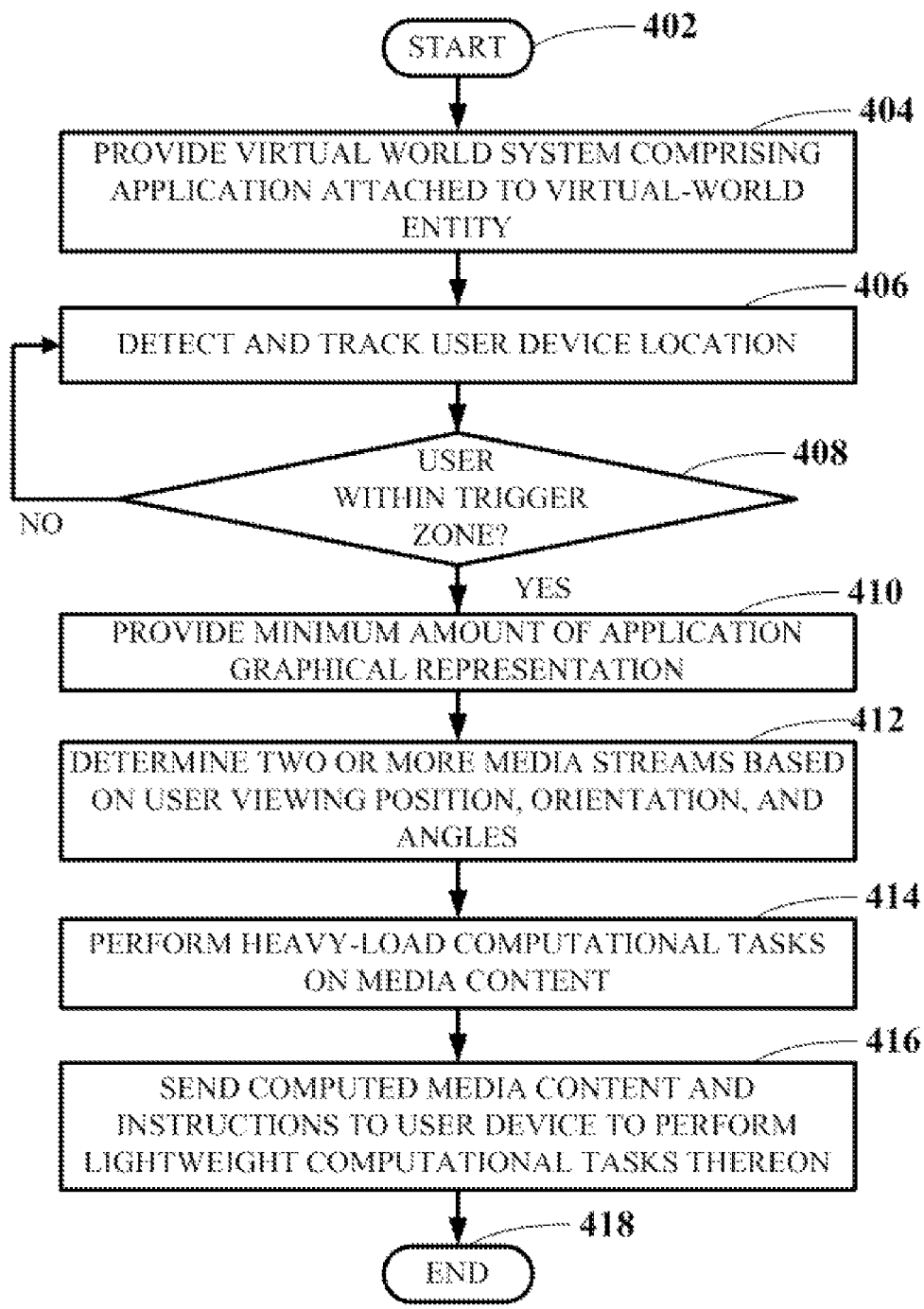
FIG. 4 depicts a flow chart of a method according to an embodiment of the present disclosure.

FIG. 4 depicts a flow chart of a computer-implemented method 400 for enabling location-based activation of applications according to an embodiment of the present disclosure. Method 400 may, for example, be executed by a system according to an embodiment of the present disclosure, such as the systems discussed with regard to FIGS. 1 to 3.

Method 400 may start at steps 402 and 404 by providing, in a memory of a server, a persistent virtual world system including a virtual version of the real-world comprising one or more applications virtually attached to virtual-world entities positioned according to real-world coordinates. Providing the application in the server may further comprise developing, testing, validating, deploying and storing the application in the memory of the server. Providing the digital application in the server may additionally include pre-processing performed by the server, such as performing sound and video compression and assembling. Afterwards, as viewed in step 406, when a user employing a user device approaches the application, the network may detect and track the user device location. The method 400 may proceed in check 408 by checking whether the user device is located within a trigger zone. In a negative case, the method 400 goes back to step 404 by detecting and tracking the user device location to detect and track the user device location. If the user device is already located within the trigger zone, the method 400 proceeds by the server providing a minimum amount of application graphical representation to the user device, as viewed in step 410. Providing the minimum amount of application graphical representation may include determining a graphical representation taking into account the user viewing position, viewing orientation, and/or viewing angles in order to display the correct images to the user.

Then, in step 412, the method 400 continues by the server determining two or more media streams based on user viewing position, orientation, and angles. Subsequently, in step 414, the method 400 proceeds by the server performing heavy-load computations on the media content, thereafter providing the user device, in step 416, with the recently computed media content along with instructions to perform lightweight computational tasks thereon. The user device may then perform these lightweight computational tasks on the computed media content and continue the interaction with the application, ending the process in terminator 418.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system enabling location-based activation of applications, comprising:
one or more servers comprising a memory and a processor, the one or more servers storing and providing a persistent virtual world system including a virtual version of a real-world space, the virtual version comprising one or more applications virtually attached to one or more virtual-world entities positioned according to real-world coordinates, wherein the one or more applications are represented in the virtual version of the real-world space with an application graphical representation of the one or more applications, wherein a user that interacts with the application graphical representation of the one or more applications receives media content from the one or more applications, and the one or more servers being configured at least to:
compute the state of the one or more virtual-world entities;
responsive to detecting a user device entering a trigger zone associated with the one or more applications, activate the one or more applications and send a minimum amount of the application graphical representation of the one or more applications to the user device via a wireless network;
responsive to detecting user interaction with the application graphical representation of the one or more applications, determine two or more media streams based on user viewing position, orientation, and viewing angle, wherein determining the two or more media streams signals the one or more servers to perform heavy-load computational tasks on respective application media content; and
stream to the user device the media content for outputting the media content.

2. The system of claim 1 further comprising the user device connected to the one or more servers via a wireless network and configured to receive and execute the one or more applications.

3. The system of claim 1, wherein the heavy-load computational tasks comprise pre-processing, by the one or more servers, of the application media content, the pre-processing comprising at least sound and video compression operations.

4. The system of claim 3, wherein the heavy-load computational tasks on media content further comprise physics simulations, lighting, shadows simulations, or rendering, or combinations thereof.

5. The system of claim 1, wherein the one or more virtual-world entities to which the one or more applications are virtually attached comprise virtual replicas of real-world objects, the virtual replicas comprising data and models that provide self-computing capabilities and autonomous behavior.

6. The system of claim 5, wherein the virtual replicas represent elements connected to the persistent virtual world system and unconnected elements, the connected elements comprising computing devices.

7. The system of claim 1, wherein the one or more virtual-world entities to which the one or more applications are virtually attached comprise fully virtual objects not existing in the real world.

8. The system of claim 1, wherein the user device comprises a mobile phone, laptop computer, mobile game console, head-mounted display, smart contact lens, or see-through device.

9. The system of claim 1, wherein the system is configured for user interactions with the one or more applications in augmented reality, virtual reality, mixed reality, or combinations thereof.

10. The system of claim 1, wherein the determining of the two or more media streams is further based on profile information of a user stored in the memory or obtained through social media networks.

11. A computer-implemented method for enabling location-based activation of applications performed by a server system comprising one or more server computers, the computer-implemented method comprising:
providing, in the server system, a persistent virtual world system including a virtual version of a real-world space, the virtual version comprising one or more applications virtually attached to virtual-world entities positioned according to real-world coordinates;
receiving a location of one or more user devices;
determining whether the one or more user devices have entered an application trigger zone based at least in part on the location of the one or more user devices;
providing, upon determining the one or more user devices entering the application trigger zone, a minimum amount of application graphical representation to the one or more user devices;
determining, responsive to an indication that the one or more user devices have downloaded the minimum amount of application graphical representation, two or more media streams based on user viewing position, orientation, and viewing angle;
performing, responsive to determining the two or more media streams, heavy-load computational tasks on the application media content; and
sending rendered media content and instructions to perform lightweight computational tasks thereon to the one or more user devices.

12. The method of claim 11, wherein the heavy-load computational tasks comprise pre-processing the application media content, the pre-processing comprising at least sound and video compression operations.

13. The method of claim 12, wherein the heavy-load computational tasks further comprise performing one or more of physics simulations, lighting, shadows simulations, or rendering, or combinations thereof.

14. The method of claim 11, wherein the virtual-world entities to which the one or more applications are virtually attached comprise virtual replicas of real-world objects, the virtual replicas comprising data and models that provide self-computing capabilities and autonomous behavior.

15. The method of claim 14 wherein the virtual replicas represent elements connected to the persistent virtual world system and unconnected elements, the connected elements comprising computing devices.

16. The method of claim 11, wherein the virtual-world entities to which the one or more applications are virtually attached comprise fully virtual objects not existing in the real world.

17. The method of claim 11, wherein the one or more user devices comprise one or more mobile phones, laptop computers, mobile game consoles, head-mounted displays, smart contact lenses, or see-through devices.

18. The method of claim 11, further comprising processing user interactions in an augmented reality, a virtual reality, or a mixed reality, or combinations thereof.

19. The method of claim 11, wherein the determining of the two or more media streams is further based on profile information of a user stored in the server system or obtained through social media networks.

20. A non-transitory computer-readable medium having stored thereon computer code configured to cause one or more computing devices to perform steps comprising:
providing a persistent virtual world system including a virtual version of a real-world space, the virtual version comprising one or more applications virtually attached to virtual-world entities positioned according to real-world coordinates;
receiving a location of one or more user devices;
determining whether the one or more user devices have entered an application trigger zone based at least in part on the location of the one or more user devices;
providing, upon receiving an indication of the one or more user devices entering the application trigger zone, a minimum amount of application graphical representation to the one or more user devices;
determining, responsive to an indication that the one or more user devices have downloaded the minimum amount of application graphical representation, two or more media streams based on user viewing position, orientation, and viewing angle;
performing, responsive to determining the two or more media streams, heavy-load computational tasks on the application media content; and
sending rendered media content and instructions to perform lightweight computational tasks thereon to the one or more user devices.

* * * * *